No. 650,261. Patented May 22, 1900.
P. S. MINTON.
FLY NET.
(Application filed Sept. 22, 1899.)
(No Model.)

WITNESSES:

INVENTOR
P. S. Minton
BY
ATTORNEYS

UNITED STATES PATENT OFFICE.

PHILIP S. MINTON, OF NEW YORK, N. Y.

FLY-NET.

SPECIFICATION forming part of Letters Patent No. 650,261, dated May 22, 1900.

Application filed September 22, 1899. Serial No. 731,316. (No model.)

*To all whom it may concern:*

Be it known that I, PHILIP S. MINTON, of the city of New York, borough of Manhattan, in the county and State of New York, have invented a new and Improved Fly-Net, of which the following is a full, clear, and exact description.

One object of the invention is to so construct a fly-net for horses that the net may be adapted to large or to small animals and attached to various portions of a harness without discommoding the animal wearing it or interfering with its movements.

Another object of the invention is to so construct the net that it may extend to the collar or the hames of a harness and to provide a breast-strap for holding the forward portion of the net in place.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
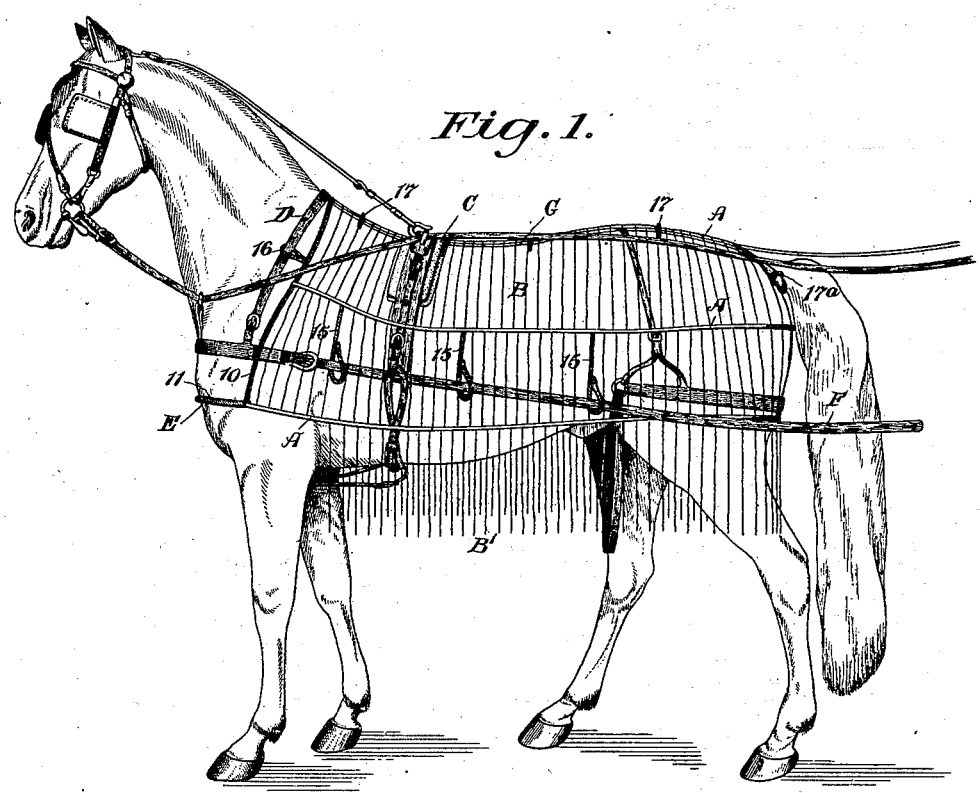
Figure 2:
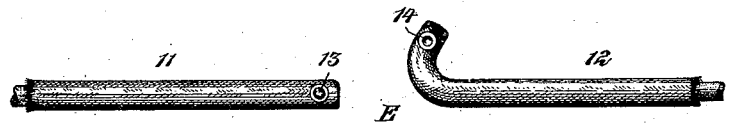

Figure 1 is a side elevation of a horse and the improved net applied to the animal. Fig. 2 is a detail view of the terminals of the net, illustrating one means of connecting the said terminals; and Fig. 3 is also a detail view of the terminals of the net, partly in side elevation and partly in section, illustrating the terminals as secured together by the fastening devices shown in Fig. 2.

The net may be made of leather, cord, or other material, and the body portion of the net is constructed practically in the same manner as the usual fly-net, comprising a series of longitudinal strands or members A and vertical strands or members B, the latter terminating in a fringe B' at the bottom portion of the net. Usually nets of this character extend to the saddle C only, but the improved net is adapted to extend to the collar D of the harness or to the hames, if the latter are used.

Figure 3:

The front end portion of the net consists of an elastic cord 10, which extends to the bottom longitudinal member of the body of the net, and the elastic cord 10 is connected at its ends with elastic straps 11 and 12, and these straps are adapted to extend across the breast of the animal, as shown in Fig. 1, and therefore may be termed "breast-straps." The terminals of the breast-straps 11 and 12 may be connected in any approved manner; but preferably one strap—the strap 11, for example—is provided with a spring or expansion stud 13, arranged to enter a socket 14, carried by the mating strap 12, as shown in Figs. 2 and 3.

In addition to the breast-straps the net is provided with retaining-straps 15, which straps are usually secured to an intermediate or side longitudinal member A of the net, and these retaining-straps 15 are passed around the traces F of the harness in the form of a loop, as shown in Fig. 1, and the ends of the retaining-straps are secured to the body or perpendicular portions by similar fastening devices to those above described.

In addition to the retaining-straps 15 the net is provided with similar straps 17, which surround or receive the back-strap G of the harness, and other retaining-straps $17^a$ may be employed, as shown in Fig. 1, adapted to receive the crupper of the harness, and likewise retaining-straps 16 may be attached to the forward elastic cord 10, the retaining-strap 16 being passed around the collar. All the retaining-straps are constructed of elastic cord and their outer extremities are formed in loops, the loops being formed by the outer ends of the straps being attached to the body by the fastening devices heretofore described or by similar means.

It will be observed that a net constructed as set forth covers the horse to a greater extent than the ordinary net and that the elastic portions of the net, while retaining the net in position, enable said net to be fitted to any size of animal and connected with any desired portion of the harness.

Having thus described my invention, I claim as new and desire to secure by Letters Patent—

1. As an improved article of manufacture, a fly-net for horses, provided with an elastic front section and elastic breast-straps, for the purpose described.

2. An article of manufacture, comprising a fly-net having its front vertical member formed of an elastic cord provided at its ends with breast-straps and means for connecting the straps, the said net being further provided with elastic retaining-cords adapted to be passed around portions of the harness, and means for forming loops in the said retaining-cords, as set forth.

In testimony whereof I have signed my name to this specification in the presence of two subscribing witnesses.

PHILIP S. MINTON.

Witnesses:
J. FRED. ACKER,
JNO. M. RITTER.